(12) United States Patent
Gao et al.

(10) Patent No.: US 8,460,805 B1
(45) Date of Patent: Jun. 11, 2013

(54) MAGNETIC LAYERS

(75) Inventors: Kaizhong Gao, Eden Prairie, MN (US); Yingguo Peng, San Ramon, CA (US)

(73) Assignee: Seagate Technology LLC, Cupertino, CA (US)

(*) Notice: Subject to any disclaimer, the term of this patent is extended or adjusted under 35 U.S.C. 154(b) by 210 days.

(21) Appl. No.: 12/978,099

(22) Filed: Dec. 23, 2010

(51) Int. Cl.
*G11B 5/66* (2006.01)

(52) U.S. Cl.
USPC ..... 428/828.1; 428/829; 428/830; 428/692.1; 428/693.1

(58) Field of Classification Search
None
See application file for complete search history.

(56) References Cited

U.S. PATENT DOCUMENTS

| | | | |
|---|---|---|---|
| 6,689,495 B1 | 2/2004 | Sato et al. | |
| 7,384,699 B2 * | 6/2008 | Nolan et al. | 428/829 |
| 8,119,263 B2 * | 2/2012 | Nolan et al. | 428/829 |
| 2005/0146992 A1 * | 7/2005 | Inomata et al. | 369/13.02 |
| 2007/0072011 A1 * | 3/2007 | Li et al. | 428/828.1 |
| 2007/0243418 A1 * | 10/2007 | Fullerton et al. | 428/828 |
| 2008/0070065 A1 * | 3/2008 | Berger et al. | 428/828.1 |
| 2008/0138662 A1 | 6/2008 | Berger et al. | |
| 2008/0144213 A1 | 6/2008 | Berger et al. | |
| 2008/0199735 A1 * | 8/2008 | Berger et al. | 428/828.1 |
| 2008/0292907 A1 * | 11/2008 | Berger et al. | 428/828 |
| 2009/0081484 A1 * | 3/2009 | Watanabe | 428/828 |
| 2009/0197120 A1 | 8/2009 | Taguchi et al. | |
| 2009/0244771 A1 | 10/2009 | Taguchi et al. | |

* cited by examiner

*Primary Examiner* — Kevin Bernatz
(74) *Attorney, Agent, or Firm* — Hollingsworth Davis (57) ABSTRACT

An apparatus includes a first magnetic layer including a plurality of grains. The first magnetic layer has a first anisotropy value. The apparatus also includes a second magnetic layer including a plurality of grains. The second magnetic layer has a second anisotropy value that is different than the first anisotropy value. The apparatus also includes an exchange tuning layer including a plurality of grains and located between the first and second magnetic layers. The exchange tuning layer has stronger inter-granular exchange coupling than the first and second magnetic layers. The exchange tuning layer has an anisotropy value less than the first and second anisotropy values.

15 Claims, 5 Drawing Sheets

MAGNETIC LAYERS

BACKGROUND

The present disclosure relates generally to the field of layers for magnetic recording media (e.g., hard disks, removable media, magnetoresistive memory, etc.). More particularly, the disclosure relates to layers for high anisotropy magnetic recording media including one or more exchange coupled granular layers.

As the grain size of layers in magnetic recording media is decreased in order to increase the areal density (e.g., to increase the capacity of the media without increasing the media size), a threshold known as the superparamagnetic limit is reached for a given material and temperature. The superparamagnetic limit is a physical constraint, beyond which stable data storage is no longer feasible.

Energy assisted magnetic recording is a recording approach where energy is locally provided to layers of a magnetic recording medium to reduce the coercivity of the recording medium and to temporarily reduce the magnetic field of the medium. These effects allow an applied magnetic writing field to more easily direct (e.g., change, hold) the magnetization of the recording medium. Energy assisted magnetic recording can include heat assisted magnetic recording (HAMR) or microwave assisted magnetic recording (MAMR). HAMR systems typically apply a combination of a magnetic write field gradient and a thermal gradient to the recording medium. MAMR systems typically apply a localized electrical field at a high frequency (e.g., a microwave frequency) to layers of the recording medium. HAMR and MAMR allow for the use of small grain media layers for recording at increased areal densities by increasing the supermagnetic limit. HAMR also allows for larger magnetic anisotropy at room temperature to increase thermal stability, because of the highly stable magnetic materials that are used (e.g., FePt alloys).

SUMMARY

One embodiment relates to a system. The system includes a magnetic recording medium. The magnetic recording medium includes a first granular magnetic layer and a second granular magnetic layer. The first magnetic layer has a first anisotropy value and the second magnetic layer has a second anisotropy value that is different than the first anisotropy value. The medium also includes a granular exchange tuning layer located between the first and second magnetic layers. The exchange tuning layer has stronger inter-granular exchange coupling than the first and second magnetic layers. The exchange tuning layer has an anisotropy value less than the first and second anisotropy values. The system further includes a write head configured to provide a magnetic field to the magnetic recording medium. The magnetic field changes or holds the binary value of one or more grains of at least one of the first and second magnetic layers. The system further includes at least one of a heat source and a microwave source configured to provide energy for energy assisted magnetic recording to the magnetic recording medium.

Another embodiment relates to an apparatus. The medium includes a first magnetic layer including a plurality of grains. The first magnetic layer has a first anisotropy value. The apparatus also includes a second magnetic layer including a plurality of grains. The second magnetic layer has a second anisotropy value that is different than the first anisotropy value. The apparatus also includes an exchange tuning layer including a plurality of grains and located between the first and second magnetic layers. The exchange tuning layer has stronger inter-granular exchange coupling than the first and second magnetic layers. The exchange tuning layer has an anisotropy value less than the first and second anisotropy values.

Another embodiment relates to an apparatus having multiple layers for use with a magnetic recording medium. The apparatus includes a first granular magnetic layer having a first anisotropy value and a second granular magnetic layer having a second anisotropy value that is different than the first anisotropy value. The apparatus also includes a granular exchange tuning layer located between the first and second magnetic layers. The exchange tuning layer has stronger inter-granular exchange coupling than the first and second magnetic layers. The exchange tuning layer has an anisotropy value less than the first and second anisotropy values.

Another embodiment relates to an apparatus. The apparatus includes a first granular magnetic layer having a first anisotropy value, a second granular magnetic layer having a second anisotropy value that is different than the first anisotropy value, and a third granular magnetic layer having a third anisotropy value. The apparatus also includes a first granular exchange tuning layer located between the first and second magnetic layers. The first exchange tuning layer has stronger inter-granular exchange coupling than the first and second magnetic layers. The first exchange tuning layer has an anisotropy value less than the first and second anisotropy values. The apparatus also includes a second granular exchange tuning layer located between the second and third magnetic layers. The second exchange tuning layer has stronger inter-granular exchange coupling than the second and third magnetic layers. The second exchange tuning layer has an anisotropy value less than the second and third anisotropy values.

Alternative embodiments relate to other features and combinations of features as may be generally recited in the claims.

DETAILED DESCRIPTION

Referring generally to the figures, high anisotropy perpendicular recording media are shown to include an exchange coupled granular structure. The media switching field distribution may be reduced by the granular structure without a significant penalty to the thermal gradient of the media. The coupling efficiency may also be greatly enhanced by the granular structure, enabling energy assisted magnetic recording technology. The granular structure described herein can be used for ultra high density energy assisted magnetic recording such as for HAMR and MAMR. The granular structure may enable a higher areal density due to an increase of switching field distribution, an increased SNR, and a better response to the assist energy. In some embodiments, the sequence of placement of a plasmonic heat sink (PUL) and soft under layer (SUL) may increase the coupling efficiency (CE) and the performance of the magnetic write field of the recording media. A HAMR structure may also assist in maintaining a high thermal gradient in the recording layer due to the disclosed granular structure. Compared to some existing magnetic recording media, each layer of the granular structure may have an anisotropy value ($H_k$) that is higher than the self demagnetization ($M_s$) of the layer. In some embodiments, $H_k$ may be greater than $4\pi M_s$.

Figure 1:
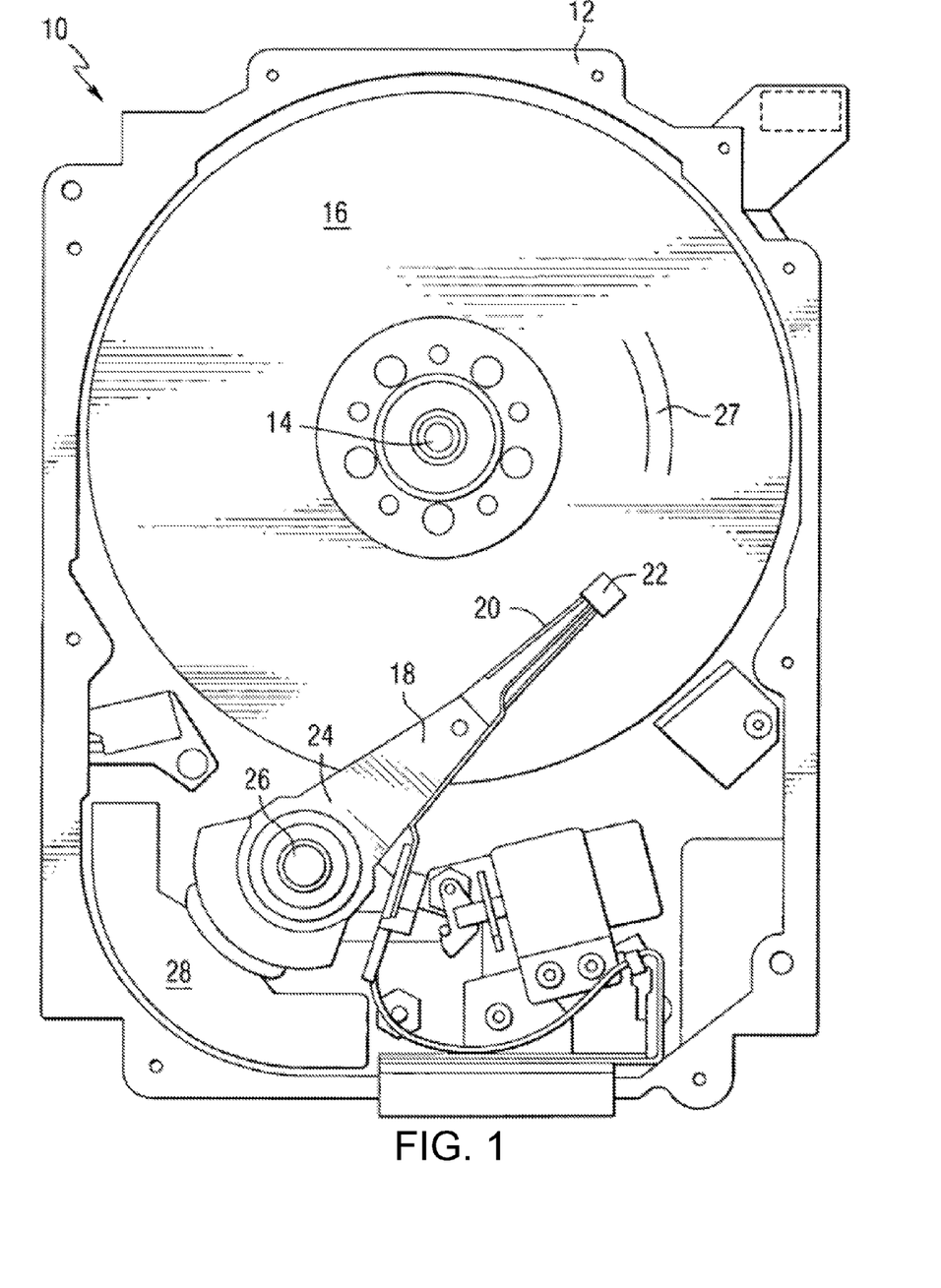
FIG. 1 is an overhead view of a portion of a disk drive storage system that can include a recording medium, according to an embodiment.

Referring to FIG. 1, a data storage device or disk drive 10 that can utilize a recording medium is shown, according to an embodiment. Disk drive 10 includes a housing 12 (illustrated with the upper portion removed and the lower portion visible) sized and configured to contain the various components of the disk drive. Disk drive 10 includes a spindle motor 14 for rotating at least one magnetic storage medium 16. Disk drive 10 also includes at least one arm 18. Each arm 18 includes a first end 20 with a recording head or slider 22 and a second end 24. Second end 24 may be pivotally mounted on a shaft by a bearing 26. Disk drive 10 further includes an actuator motor 28 located at second end 24 for pivoting arm 18 to position the recording head 22 over a predetermined sector or track 27 of medium 16. Actuator motor 28 may be regulated by digital or analog electronics or by a controller.

In a MAMR system, an electric current arc at a high frequency (e.g., a microwave frequency) may be directed onto a surface of data storage medium 16 to facilitate switching of the magnetization of the area. In some embodiments, MAMR recording heads include one or more electrodes configured to provide a electrical current arc to localized portions of storage medium 16. In other embodiments, other types of MAMR recording heads may be used.

In a HAMR system, an electromagnetic wave of, for example, visible, infrared or ultraviolet light may be directed onto a surface of data storage medium 16 to raise the temperature of a localized area of medium 16 to facilitate switching of the magnetization of the area. In some embodiments, HAMR recording heads include a thin film waveguide on a slider to guide light to storage medium 16 for localized heating of storage medium 16. A grating coupler may be used to provide light to the waveguide. In other embodiments, other types of HAMR recording heads may be used.

While FIG. 1 illustrates a disk drive, in other embodiments, other storage devices may be used that include a transducer, a magnetic storage medium, and an actuator for causing relative movement between the transducer and the magnetic storage medium.

Figure 2:
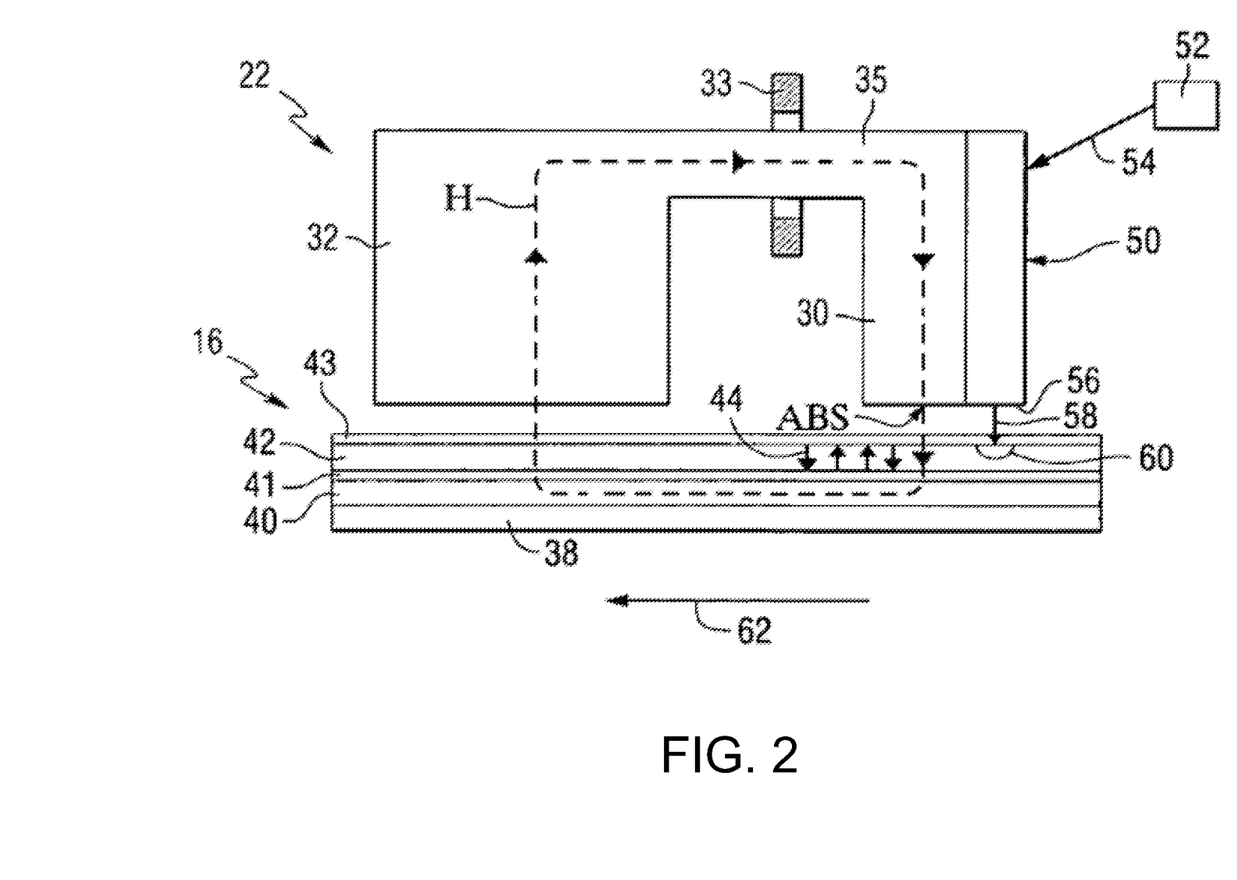
FIG. 2 is a schematic illustration of a heat assisted magnetic recording head and recording medium, according to an embodiment.

Referring to FIG. 2, a schematic side view of a HAMR recording head 22 and magnetic recording medium 16 is shown, according to an embodiment. Although an embodiment is illustrated and described for a HAMR system, in other embodiments, similar elements may be used in conjunction with MAMR systems. Head 22 may include a write section comprising a main write pole 30 and a return or opposing pole 32. Write pole 30 and return pole 32 are magnetically coupled by a yoke or pedestal 35. In other embodiments, head 22 may include write pole 30 and not include return pole 32 or yoke 35. Head 22 also includes a magnetization coil 33 that surrounds yoke 35 for energizing head 22. Head 22 may also include a read portion that may be any suitable read head.

Recording medium 16 may be positioned adjacent to or under recording head 22. Relative movement and/or rotation of at least one of head 22 and medium 16 is indicated by arrow 62, however in other embodiments, relative movement may be in the opposite direction. Medium 16 is shown to include a substrate 38, a heat sink layer 40, a seed layer 41, one or more magnetic recording layers 42, and a protective layer 43. Magnetic field H produced by current in coil 33 may be used to control the direction of magnetization of bits or grains 44 in the recording layer of medium 16. For example, magnetic field H may change or hold the magnetization or binary value of each bit 44.

Recording head 22 also includes a structure 50 for heating magnetic recording medium 16 proximate to the location where write pole 30 applies the magnetic write field H to recording medium 16. For example, structure 50 may be a planar optical waveguide or another structure suitable for heating medium 16. Structure 50 conducts energy from a source 52 of electromagnetic radiation, which may be for example, ultraviolet, infrared, or visible light. Source 52 may be, for example, a laser diode, or other suitable laser light source for directing a light beam 54 towards structure 50. Any suitable technique for coupling or providing light beam 54 to structure 50 may be used in varying example systems. For example, light source 52 may operate in association with an optical fiber and external optics for collimating light beam 54 from the optical fiber toward a diffraction grating on structure 50. In other embodiments, a laser may be mounted on structure 50 and light beam 54 may be directly provided to structure 50 without the use of external optical configurations. Once light beam 54 is provided to structure 50, the light propagates through structure 50 toward a truncated end 56 of structure 50 that is formed adjacent the air-bearing surface (ABS) of recording head 22. Light 58 exits the end of the waveguide and heats a portion 60 of medium 16 as medium 16 moves relative to recording head 22 (e.g., as shown by arrow 62).

While a specific example of HAMR is illustrated, according to other embodiments, MAMR techniques may be used instead of HAMR techniques. For example, structure 50 may be replaced by a structure (e.g., an electrode) configured to provide a current arc at a high frequency to recording medium 16. In such an embodiment, light source 52 may replace a power source configured to provide high frequency current to the electrode. In other examples, other MAMR techniques may be used in conjunction with head 22 and medium 16.

Figure 3:
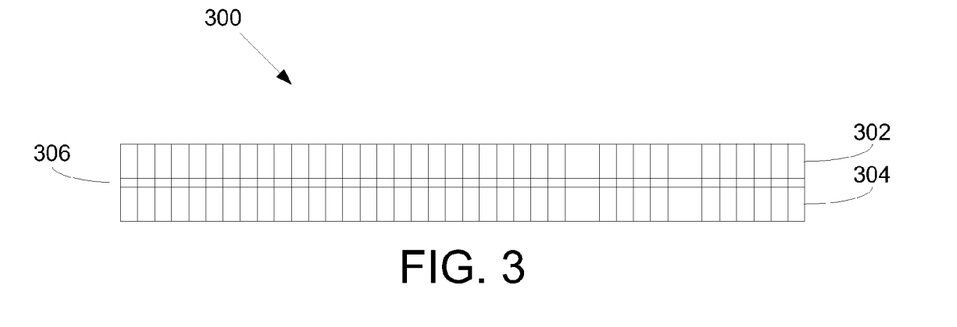
FIG. 3 is a schematic sectional view of magnetic layers of a recording medium, according to some embodiments.
Figure 4:
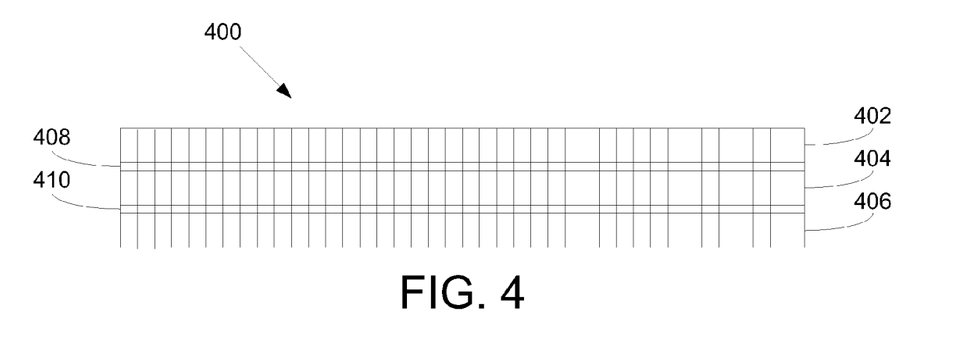
FIG. 4 is a schematic sectional view of magnetic layers of a recording medium, according to other embodiments.

Referring to FIGS. 3-4, various example magnetic layer structures for perpendicular media are shown. Different layers of FIGS. 3-4 may be made of similar or different materials and may have similar or different anisotropies. For example, the thinner layers are exchange tuning or break layers having a plurality of grains ("granular exchange tuning layers"). The thicker layers may be magnetic layers having a plurality of grains ("granular magnetic layers"). The granular exchange tuning layers have larger exchange coupling and lower anisotropy than the granular magnetic layers. In various embodiments, even the lower anisotropy exchange coupling layers may have an anisotropy ($H_k$) higher than 6 kOe ($4\pi M_s$). In the illustrations of FIGS. 3-4, the substrate, SUL, seed layer, and interlayer are not shown. Rather, for clarity, only the magnetic layers and exchange coupling or exchange tuning layers are shown. It should be appreciated that suitable substrates, SULs, seed layers, or interlayers may be a part of one or more of the embodiments described herein. In some embodiments, each of the magnetic layers may record different information. In other embodiments, each of the magnetic layers may record the same information. That is, the magnetization configuration may be correlated between the grains in different layers. Such a correlation may result in increased data integrity and/or increased SNR.

Referring specifically to FIG. 3, a dual layer granular structure 300 is illustrated, according to some embodiments. Structure 300 includes a first granular magnetic layer 302 and a second granular magnetic layer 304. First and second granular magnetic layers 302 and 304 are connected by a granular exchange tuning layer 306. The anisotropy of each of magnetic layers 302 and 304 may be greater than the anisotropy of exchange tuning layer 306.

The anisotropy of layers 302 and 304 may be approximately equal or may be different. Likewise, the inter-granular exchange coupling of layers 302 and 304 may be approximately equal or may be different. The inter-granular exchange coupling within each magnetic layer 302 and 304 may be relatively small with respect to or weaker than the exchange coupling of exchange tuning layer 306. Exchange-tuning layer 306 may be configured to couple grains of the magnetic layers.

When constructing an exchange tuning layer 306, the strength of the exchange coupling performed by exchange tuning layer 306 may be adjusted by varying the thickness of the layer. In some embodiments, exchange tuning layer 306 may be made of ferromagnetic materials. In the embodiments of FIG. 3, each magnetic layer 302 and 304 has high anisotropy. Magnetic layers 302 and 304 may be made of FePt materials with each layer having different doping amounts or materials. The FePt materials may be doped with a non-magnetic or magnetic material at the grain boundaries or in the grain cores, such as a C, BN, TiOx, or SiOx material or a Cu, Ag, Ni, or Co material. In other examples, layers 302 and 304 may be made of other ferromagnetic materials and/or doped with other non-magnetic materials. Magnetic layers 302 and 304 may also be adjusted by varying the thickness. Such adjustment affects signal amplitude for read or playback operations. In some embodiments, the thickness of one or more of layers 302 and 304 may be relatively low in order to increase signal amplitude.

Referring specifically to FIG. 4, a three layer granular structure 400 is illustrated, according to an embodiment. Structure 400 includes a first granular magnetic layer 402, a second granular magnetic layer 404, and a third granular magnetic layer 406. First and second magnetic layers 402 and 404 are connected by a granular exchange tuning layer 408. Second and third magnetic layers 404 and 406 are connected by a granular exchange tuning layer 410. The anisotropy of each of magnetic layers 402, 404, and 406 may be greater than the anisotropy of exchange tuning layers 408 and 410.

The inter-granular exchange coupling within each magnetic layer 402, 404, and 406 may be relatively small with respect to or weaker than exchange tuning layers 408 and 410. Exchange-tuning layers 408 and 410 are configured to couple grains of the magnetic layers. When constructing an exchange tuning layer 408 or 410, the strength of the exchange coupling in exchange tuning layers 408 and 410 may be adjusted by varying the thickness of the layer.

In the embodiments of FIG. 4, each magnetic layer 402, 404, and 406 may have high anisotropy. In some embodiments, exchange tuning layers 408 and 410 may be made of ferromagnetic materials. For example, magnetic layers 402, 404, and 406 may be made of FePt materials with each layer having different doping amounts or materials. The FePt materials may be doped with a non-magnetic or magnetic material at the grain boundaries or in the grain cores, such as a C, BN, TiOx, or SiOx material or a Cu, Ag, Ni, or Co material. In other examples, layers 402, 404, and 406 may be made of other ferromagnetic materials and/or doped with other non-magnetic materials. Magnetic layers 402, 404, and 406 may also be adjusted by varying the thickness. Such adjustment affects signal amplitude for read or playback operations. In some embodiments, the thickness of one or more of layers 402, 404, and 406 may be relatively low in order to increase signal amplitude.

In one embodiment, first and third magnetic layers 402 and 406 have anisotropy values that are similar or equal. Second magnetic layer 404 has anisotropy that may be different than the anisotropy of first and third layers 402 and 406, but that may still be greater than the anisotropy of exchange tuning layers 408 and 410.

In another embodiment, magnetic layer 402 has lower anisotropy than magnetic layers 404 and 406 and has higher or stronger inter-granular exchange coupling than magnetic layers 404 and 406. In an alternative embodiment, magnetic layer 406 has lower anisotropy than magnetic layers 402 and 404 and has higher or stronger inter-granular exchange coupling than magnetic layers 402 and 404. In another alternative embodiment, magnetic layer 404 has lower anisotropy than magnetic layers 402 and 406 and has higher or stronger inter-granular exchange coupling than magnetic layers 402 and 406. In each embodiment, the lower anisotropy magnetic layer may still have a higher anisotropy and weaker exchange coupling than exchange tuning layers 408 and 410. In such an embodiment, the other two magnetic layers each have high anisotropy and weak exchange coupling. However, the specific anisotropy and exchange coupling of the layers may be different or may be approximately equal. For example, each of magnetic layers 402, 404, and 406 may have different anisotropy and exchange coupling. Within each layer, the specific grains may be decoupled with the adjacent layer to a greater or lesser degree. Exchange tuning layers 408 and 410 may be varied in order to achieve an optimal SNR. In some embodiments, one of magnetic layers 402, 404, and 406 may be a continuous layer rather than a granular layer.

A micromagnetic simulation of the magnetization-applied magnetic field loop (M-H loop) was completed to compare usage of structures 300 and 400 to other magnetic media. The anisotropy distribution of each layer may be about the same as compare to other magnetic media. However, the results show that the switching field distribution may be reduced when at least two granular magnetic layers are exchange coupled together and the exchange tuning layer has an anisotropy value less than the magnetic layers, but exchange coupling greater than that of the magnetic layers.

Figure 5:
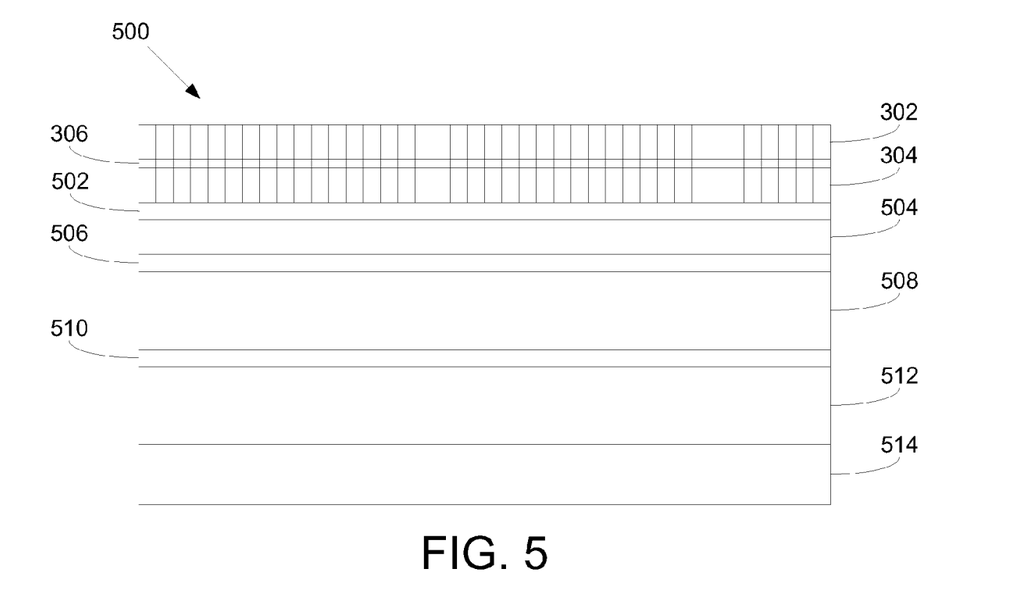
FIGS. 5 and 6 are schematic sectional views of recording media for heat-assisted magnetic recording, according to two embodiments.
Figure 6:
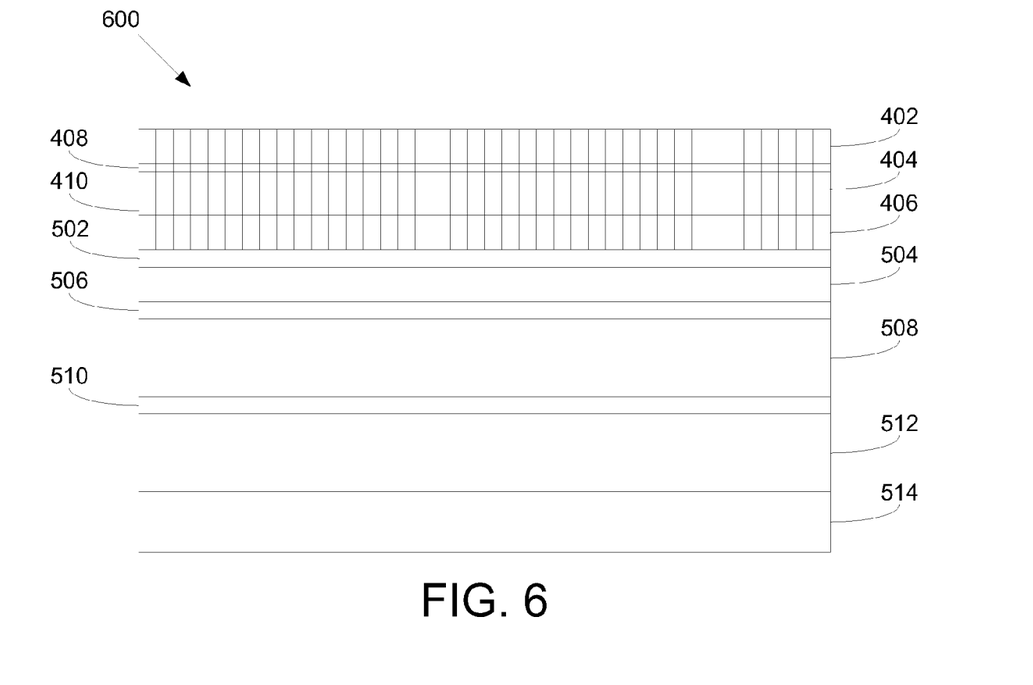

Referring now to FIGS. 5 and 6, structures 300 and 400 are shown in media structures 500 and 600 that may be suitable for use in a HAMR system according to various embodiments. The magnetic and exchange tuning layers of structures 300 and 400 can have anisotropy and exchange coupling levels as described above with respect to FIGS. 3 and 4. The anisotropy of each of the granular magnetic layers may be greater than the anisotropy of the exchange tuning layer.

Referring specifically to FIG. 5, media structure 500 is shown to include the layers of structure 300 as well as a seed layer 502 for magnetic layer 304, a plasmonic heat sink (PUL) 504, a seed layer 506 for PUL 504, a first soft under layer (SUL) 508, an Ru layer 510, a second SUL 512, and a seed layer 514 for SUL 512.

Referring specifically to FIG. 6, media structure 600 includes the layers of three magnetic layer structure 400 as well as seed layer 502 for magnetic layer 404, PUL 504, seed layer 506 for PUL 504, first SUL 508, Ru layer 510, second SUL 512, and seed layer 514 for SUL 512. It is noted that FIGS. 5 and 6 are illustrations and that the overcoat, lubricant, and other layers are not shown. Only the magnetic and optical functioning layers for the HAMR system are shown.

The anisotropy of each magnetic layer can be different to make up a gradient $H_k$ structure. Each of seed layers 502, 506, and 512, PUL 504, SULs 508 and 512, and Ru layer 510 may be any layer appropriate for use in a HAMR system. In some embodiments, the materials and thickness of each layer may be appropriately selected based on the properties of the layers within structures 300 or 400. For example, Ru layer 510 may alternatively be an $RuO_2$ layer, a Ti layer, a Pt layer, etc. In another example, PUL 504 may have a thickness of between about 4 nm and 150 nm, between about 4 and 40 nm, etc. The thickness of PUL 504 may be much smaller than the total thickness of SUL layers 508 and 512.

A micromagnetic simulation of the write field from the write pole of the HAMR system, with and without an SUL, was performed by the applicants. For HAMR, the write pole size may be as large as about 300 nm. The results of the micromagnetic simulation showed that use of an SUL enhances the strength of the total write field by about 80%. For a large write pole, the SUL can be further away from the media and the total write field can be still increased as compare to an embodiment without an SUL. SULs 508 and 512 may include ferromagnetic materials or superparamagnetic materials. For example, SUL 508 or SUL 512 may include at least one of a CoFe, CoNiFe, CoFeX, CoFeXY, NiFeX, and NiFeXY material, where X and Y are metallic or non-metallic doping materials of less than about 20% concentration by weight.

A simulation of the field intensity due to usage of PUL 504 in contrast to usage of a non-plasmonic heat sink (e.g., a Si heat sink) was performed by the applicants. Usage of PUL 504 was shown in the simulation to lead to an enhancement of the coupling efficiency (CE). PUL 504 may include materials with good plasmonic properties, such as metal (e.g., Cu, Ag, etc.) and metallic alloys. It is noted that in various embodiments, a dedicated thermal barrier layer may be omitted.

Figure 7:
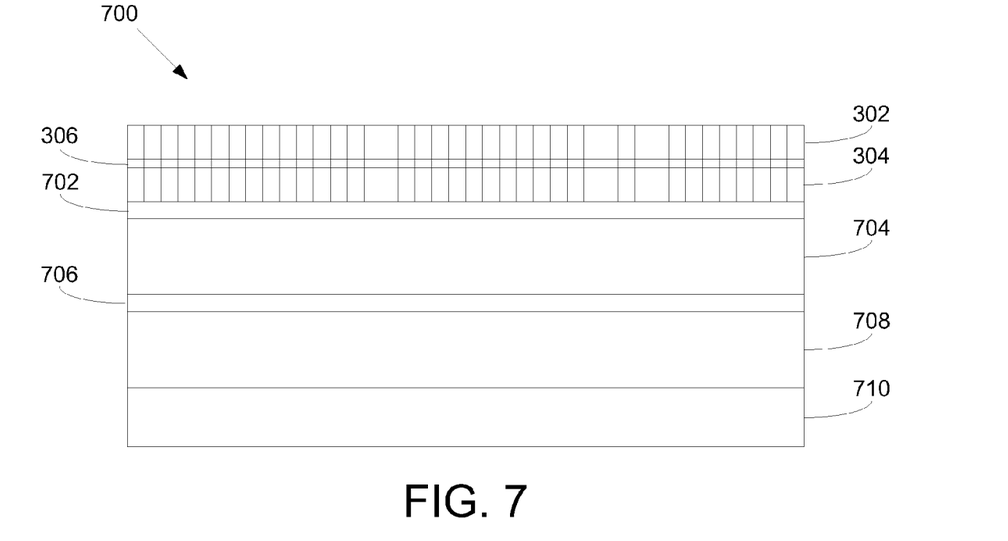
FIGS. 7 and 8 are schematic sectional views of recording media for microwave-assisted magnetic recording, according to two embodiments.
Figure 8:
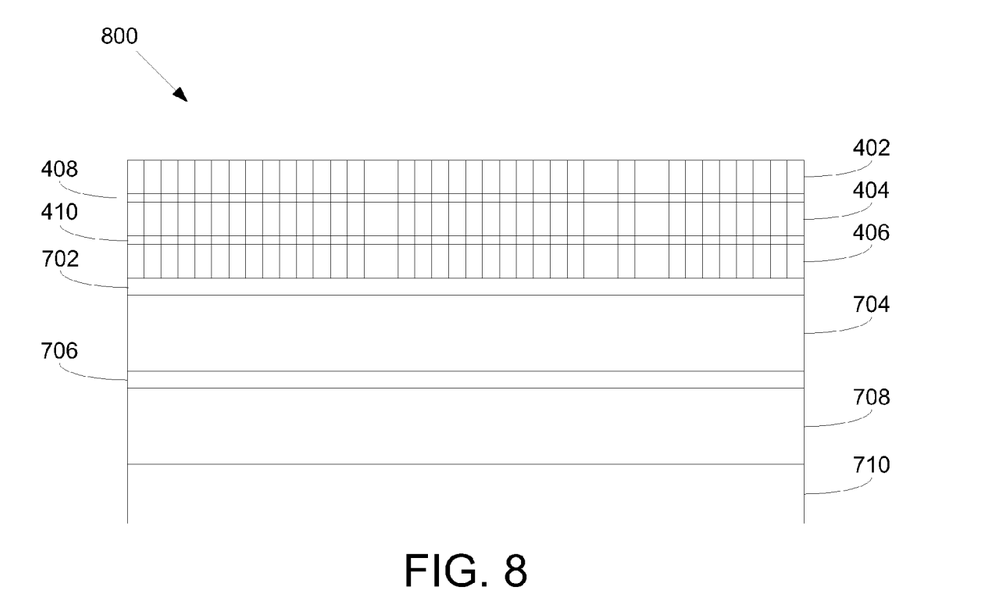

Referring now to FIGS. 7 and 8, structures 300 and 400 are shown in media structures 700 and 800 that may be suitable for use in a MAMR system according to various embodiments. The magnetic and exchange tuning layers of structures 300 and 400 can have anisotropy and exchange coupling levels as described above with respect to FIGS. 3 and 4. The anisotropy of each of the granular magnetic layers may be greater than the anisotropy of the exchange tuning layer.

Referring specifically to FIG. 7, media structure 700 includes the layers of structure 300 as well as a seed layer 702 for magnetic layer 304, a first SUL 704, an Ru layer 706, a second SUL 708, and a seed layer 710 for SUL 708. Referring specifically to FIG. 8, media structure 800 includes the layers of three magnetic layer structure 400 as well as seed layer 702 for magnetic layer 404, first SUL 704, Ru layer 706, second SUL 708, and seed layer 710 for SUL 708. It is noted that FIGS. 7 and 8 are illustrations and that the overcoat, lubricant, and other layers are not shown. Rather, for clarity, only the magnetic and optical functioning layers for the MAMR system are shown.

The anisotropy of each magnetic layer can be different to make up a gradient $H_k$ structure. The top magnetic layer (302 or 402) can shave a lower anisotropy (e.g., $H_k > 4\pi M_s$) than the exchange tuning layer, but still have a much lower anisotropy than the anisotropy of second and third magnetic layers. Each of seed layers 702 and 710, SULs 704 and 708, and Ru layer 706 may be any layer appropriate for use in a MAMR system. In some embodiments, the materials and thickness of each layer may be appropriately selected based on the properties of the layers within structures 300 or 400. For example, Ru layer 706 may alternatively be an RuO2 layer, a Ti layer, a Pt layer, etc. SULs 704 and 708 may include ferromagnetic materials or superparamagnetic materials. For example, SUL 704 or SUL 708 may include at least one of a CoFe, CoNiFe, CoFeX, CoFeXY, NiFeX, and NiFeXY material, where X and Y are metallic or non-metallic doping materials of less than about 20% concentration by weight.

A simulation of the SNR penalty for each percentage of anisotropy distribution increase in perpendicular media was performed by the applicants. The results show that as the write transition width approaches the grain size limit, the final SNR depends on the anisotropy distribution. The SNR increases as the anisotropy distribution may be reduced. Additional penalty may be observed if the medium switching field (anisotropy) distribution may be large. The resolution was increased by enhancing thermal anisotropy in the recording layer by using a granular layer structure (e.g., structure 300 or 400) instead of using continuous layers coupled to each other or a continuous layer coupled to a single granular layer.

FIGS. 5-8 specifically show the use of multiple SULs (e.g., SULs 508, 512 and SULs 704, 708) with a layer of Ru (e.g., Ru layers 510 and 706). In other embodiments, the Ru layer (e.g., Ru layer 510, Ru layer 706) and corresponding SUL (e.g., SUL 512, SUL 708) may be omitted. In such embodiments, the media structure may include a single SUL (e.g., SUL 508, SUL 704) and no Ru layer. The single SUL (e.g., SUL 508, SUL 704) may include ferromagnetic materials or superparamagnetic materials. For example, the SUL may include at least one of a CoFe, CoNiFe, CoFeX, CoFeXY, NiFeX, and NiFeXY material, where X and Y are metallic or non-metallic doping materials of less than about 20% concentration by weight.

The construction and arrangement of the components as shown in the various embodiments is illustrative. Although only a few embodiments have been described in detail in this disclosure, those skilled in the art who review this disclosure will readily appreciate that many modifications are possible (e.g., variations in dimensions, structures, shapes and proportions of the various elements, mounting arrangements, use of materials, orientations, etc.) without materially departing from the teachings of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method may be varied or re-sequenced according to alternative embodiments. Other substitutions, modifications, changes and omissions may be made in the design, operating conditions and arrangement of the various embodiments without departing from the scope of the appended claims.

What is claimed is:

1. An apparatus, comprising:
    a first magnetic layer comprising a plurality of grains, the first magnetic layer having a first anisotropy value ($H_k$);
    a second magnetic layer comprising a plurality of grains and having stronger inter-granular exchange coupling than the first magnetic layer and a third magnetic layer, the second magnetic layer having a second anisotropy value ($H_k$) that is less than the first anisotropy value ($H_k$) and a third anisotropy value ($H_k$);
    an exchange tuning layer comprising a plurality of grains and located between the first and second magnetic layers, the exchange tuning layer having stronger inter-granular exchange coupling than the first and second magnetic layers, the exchange tuning layer having an anisotropy value ($H_k$) less than the first and second anisotropy values;

the third magnetic layer comprising a plurality of grains, the third magnetic layer having the third anisotropy value ($H_k$); and a second exchange tuning layer comprising a plurality of grains and located between the second and third magnetic layers.

2. The apparatus of claim 1, wherein the third anisotropy value is the same as the first anisotropy value.

3. The apparatus of claim 1, wherein the second exchange tuning layer has stronger inter-granular exchange coupling than the second and third magnetic layers, and wherein the second exchange tuning layer has an anisotropy value ($H_k$) less than the second and third anisotropy values.

4. The apparatus of claim 1, wherein each of the first, second, and third anisotropy values are different.

5. The apparatus of claim 1, further comprising:
at least one seed layer; and
at least one soft under layer,
wherein a heat source or a microwave source provides energy for energy assisted magnetic recording to a magnetic recording medium.

6. The apparatus of claim 5, further comprising:
at least one of a second seed layer, a second soft under layer, a layer comprising ruthenium, and a heat sink.

7. The apparatus of claim 1, wherein each layer of the granular structure has an anisotropy value ($H_k$) that is greater than the self demagnetization ($M_s$) of the layer.

8. The apparatus of claim 7, wherein $H_k$ of each layer is greater than $4\pi M_s$.

9. An apparatus comprising:
a first granular magnetic layer, the first granular magnetic layer having a first anisotropy value ($H_k$);
a second granular magnetic layer having stronger inter-granular exchange coupling than the first granular magnetic layer and a third granular magnetic layer, the second granular magnetic layer having a second anisotropy value ($H_k$) that is less than the first anisotropy value and a third anisotropy value ($H_k$);
a granular exchange tuning layer located between the first and second granular magnetic layers, the exchange tuning layer having stronger inter-granular exchange coupling than the first and second granular magnetic layers, the exchange tuning layer having an anisotropy value ($H_k$) less than the first and second anisotropy value;
the third granular magnetic layer having the third anisotropy value ($H_k$); and a second granular exchange tuning layer located between the second and third granular magnetic layers.

10. The apparatus of claim 9,
wherein the second granular exchange tuning layer has stronger inter-granular exchange coupling than the second and third granular magnetic layers, the second granular exchange tuning layer having an anisotropy value less than the second and third anisotropy values.

11. The apparatus of claim 10, wherein the third anisotropy value is the same as the first anisotropy value.

12. The apparatus of claim 9, wherein the granular structure is a part of a heat assisted magnetic recording medium or a microwave assisted magnetic recording medium.

13. The apparatus of claim 9, wherein each layer of the granular structure has an anisotropy value ($H_k$) that is greater than the self demagnetization ($M_s$) of the layer.

14. The apparatus of claim 13, wherein $H_k$ of each layer is greater than $4\pi M_s$.

15. A system, comprising:
a magnetic recording medium, comprising:
a first granular magnetic layer, the first granular magnetic layer having a first anisotropy value ($H_k$);
a second granular magnetic layer having stronger inter-granular exchange coupling than the first granular magnetic layer and a third granular magnetic layer, the second granular magnetic layer having a second anisotropy value ($H_k$) that is less than the first anisotropy value and a third anisotropy value ($H_k$);
a granular exchange tuning layer located between the first and second granular magnetic layers, the exchange tuning layer having stronger inter-granular exchange coupling than the first and second granular magnetic layers, the exchange tuning layer having an anisotropy value ($H_k$) less than the first and second anisotropy value;
the third granular magnetic layer having the third anisotropy value; and
a second granular exchange tuning layer located between the second and third granular magnetic layers,
wherein the system further comprises:
a write head configured to provide a magnetic field to the magnetic recording medium, the magnetic field changing or holding the binary value of one or more grains of at least one of the first and second magnetic layers; and
a heat source or a microwave source configured to provide energy for energy assisted magnetic recording to the magnetic recording medium.

* * * * *

UNITED STATES PATENT AND TRADEMARK OFFICE
CERTIFICATE OF CORRECTION

PATENT NO.       : 8,460,805 B1                                  Page 1 of 1
APPLICATION NO.  : 12/978099
DATED            : June 11, 2013
INVENTOR(S)      : Kaizhong Gao et al.

It is certified that error appears in the above-identified patent and that said Letters Patent is hereby corrected as shown below:

In the Claims

Column 9, line 47, Claim 9: "anisotropy value" should read --anisotropy values--.

Column 10, line 35, Claim 15: "anisotropy value;" should read --anisotropy values;--.

Signed and Sealed this
Third Day of September, 2013

Teresa Stanek Rea
*Acting Director of the United States Patent and Trademark Office*